(12) United States Patent
Jeng

(10) Patent No.: US 9,920,822 B2
(45) Date of Patent: Mar. 20, 2018

(54) DOUBLE NUT BALL SCREW CAPABLE OF SENSING PRELOAD

(71) Applicant: NATIONAL CHUNG CHENG UNIVERSITY, Chia-Yi County (TW)

(72) Inventor: Yeau-Ren Jeng, Tainan (TW)

(73) Assignee: NATIONAL CHUNG CHENG UNIVERSITY, Min-Hsiung, Chia-Yi County (TW)

( * ) Notice: Subject to any disclaimer, the term of this patent is extended or adjusted under 35 U.S.C. 154(b) by 344 days.

(21) Appl. No.: 14/956,935

(22) Filed: Dec. 2, 2015

(65) Prior Publication Data

US 2017/0159778 A1 Jun. 8, 2017

(51) Int. Cl.
*F16H 25/22* (2006.01)

(52) U.S. Cl.
CPC ..... *F16H 25/2214* (2013.01); *F16H 25/2209* (2013.01)

(58) Field of Classification Search
CPC .................................................. F16H 25/2006
See application file for complete search history.

(56) References Cited

U.S. PATENT DOCUMENTS

| 6,131,478 A * | 10/2000 | Erikson | F16H 25/2006 |
| | | | 74/441 |
| 6,158,720 A * | 12/2000 | Patrick | B66F 3/18 |
| | | | 254/103 |
| 9,145,958 B2 * | 9/2015 | Jeng | F16H 25/2006 |
| 9,279,487 B1 * | 3/2016 | Guglietti | F16H 25/2214 |

FOREIGN PATENT DOCUMENTS

| JP | H05141498 A | 6/1993 |
| TW | 201422946 A | 6/2014 |

* cited by examiner

*Primary Examiner* — Terence Boes
(74) *Attorney, Agent, or Firm* — Muncy, Geissler, Olds & Lowe, P.C.

(57) ABSTRACT

A double nut ball screw capable of sensing preload includes a screw rod, two nuts, a connection key, multiple balls, a deformable annular platform having a U-shaped cross section with a bottom wall portion and two sidewall portions integrally connected with two opposite lateral sides of the bottom wall portion, and an annular force sensor mounted on the bottom wall portion of the deformable annular platform and located between the two sidewall portions. The deformable annular platform has a protruded portion located at the outer surface of the bottom wall portion opposite to the force sensor, and is disposed in the gap between the two nuts and wedged between two mating surfaces of the two nuts with the distal ends of the sidewall portions abutted against the mating surface of one nut and the protruded portion abutted against the mating surface of the other nut.

5 Claims, 8 Drawing Sheets

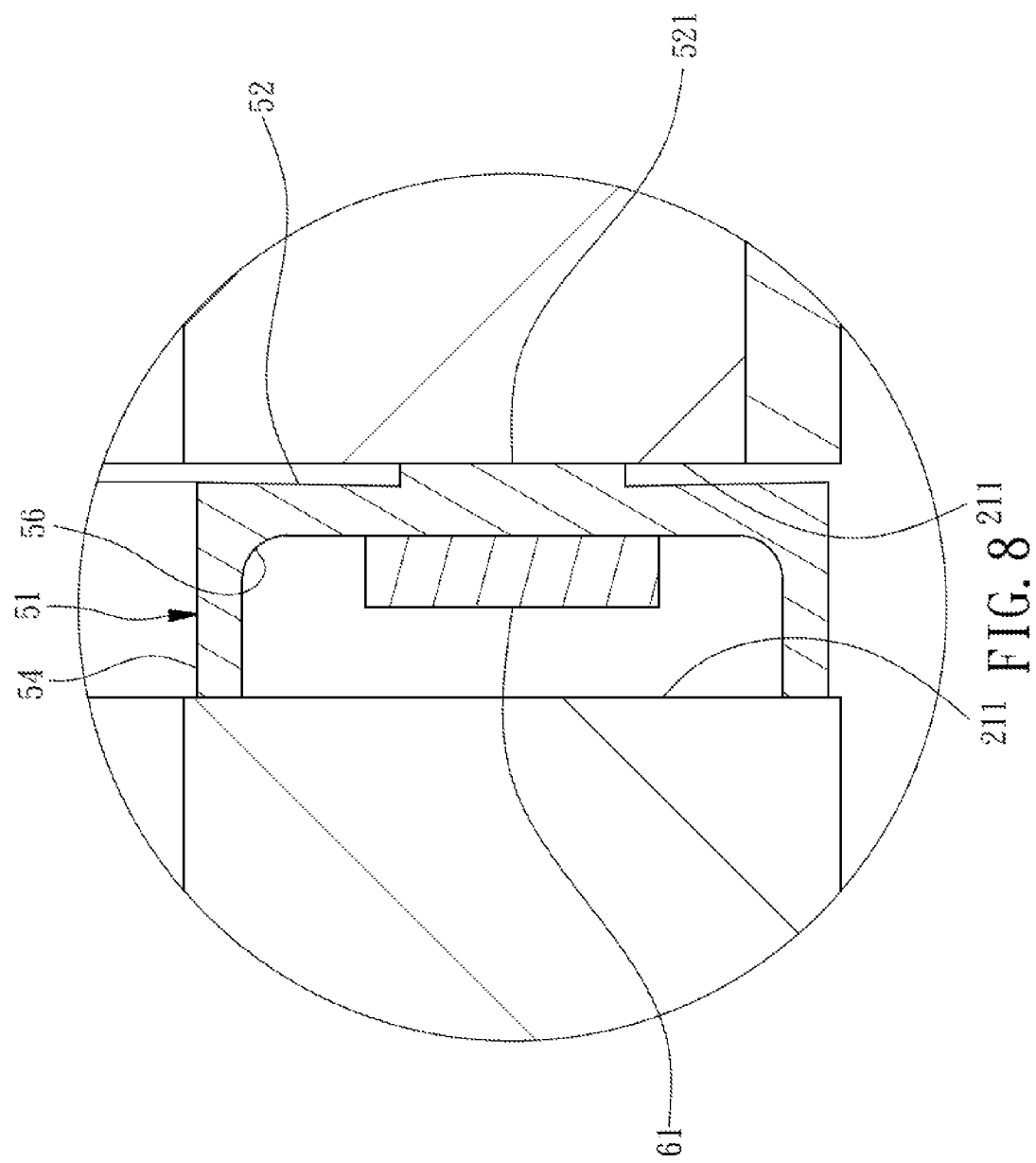

DOUBLE NUT BALL SCREW CAPABLE OF SENSING PRELOAD

BACKGROUND OF THE INVENTION

1. Field of the Invention

The present invention relates to ball screws and more particularly, to a double nut ball screw capable of sensing preload.

2. Description of the Related Art

A conventional double nut ball screw generally comprises two nuts threaded onto a screw rod, a preloading plate mounted between the two nuts, and a connection key having two opposite ends respectively mounted in two keyways provided on peripheries of the two nuts. Thus, the two nuts maintain a preload to hold down the preloading plate during rotation of the screw rod, preventing occurrence of an axial gap during movement of the two nuts and enhancing the rigidity, positioning accuracy and position stability of the ball screw in the operation.

After a long use of the ball screw, the balls, the screw rod and the nuts may start to wear, causing occurrence of an axial gap. When an axial gap occurs, the preload between the two nuts will be relatively reduced, lowering the rigidity, positioning accuracy and position stability of the ball screw.

It can be seen from the above, the preload is one of the key indicators for the measurement of the rigidity, positioning accuracy and positioning stability of the ball screw.

Taiwan Patent Publication No. 201422946 discloses a ball screw that allows real-time monitoring of the preload, which has a force sensor set between the two nuts of the ball screw for monitoring the preload between the two nuts.

Further, Japan Patent JPH05-141498 discloses a technique of setting a preload sensing means between the two nuts of a ball screw to detect the preload.

However, the above-described prior art techniques simply have a force sensor be set between the two nuts of a ball screw without providing any measure to enhance the preload sensing sensitivity and effect.

SUMMARY OF THE INVENTION

The present invention has been accomplished under the circumstances in view. It is the main object of the present invention to provide a double nut ball screw having a preload sensing function, which enhances the sensitivity and effect of the preload sensing of the force sensor.

To achieve the above object, the present invention provides a double nut ball screw which comprises a screw rod having an outer thread, two nuts each having a mating surface and an inner thread, a connection key, a plurality of balls, a deformable annular platform, and a force sensor of annular shape. The two nuts are threaded onto the screw rod and defining with the screw rod a ball circulation path. The mating surface of one nut faces toward the mating surface of the other nut with a gap left therebetween. Each nut is provided on a periphery thereof with a keyway, and the keyways of the two nuts are in alignment with each other and located adjacent to the gap. The connection key is mounted in the keyways of the two nuts to bridge the two nuts over the gap. The balls are mounted in the ball circulation path and capable of rolling and moving in the ball circulation path upon rotation of the screw rod. The deformable annular platform has a U-shaped cross section with a bottom wall portion and two sidewall portions integrally connected with two opposite lateral sides of the bottom wall portion, respectively. The force sensor is mounted on the bottom wall portion of the deformable annular platform and located between the two sidewall portions. The deformable annular platform further has a protruded portion located on an outer surface of the bottom wall portion opposite to the force sensor. The width of the protruded portion is not larger than the width of the bottom wall portion. The deformable annular platform is disposed in the gap and wedged between the mating surfaces of the two nuts. The deformable annular platform has distal ends of the two sidewall portions thereof abutted against the mating surface of one nut and the protruded portion abutted against the mating surface of the other nut.

Thus, the use of the deformable annular platform greatly enlarges the effect of the preload, enhancing the sensitivity and effect of the preload sensing of the force sensor.

Other advantages and features of the present invention will be fully understood by reference to the following specification in conjunction with the accompanying drawings, in which like reference signs denote like components of structure.

BRIEF DESCRIPTION OF THE DRAWINGS

FIG. 8 is similar to FIG. 7, illustrating the deformable annular platform elastically deformed during operation of the double nut ball screw.

DETAILED DESCRIPTION OF THE INVENTION

Figure 1:
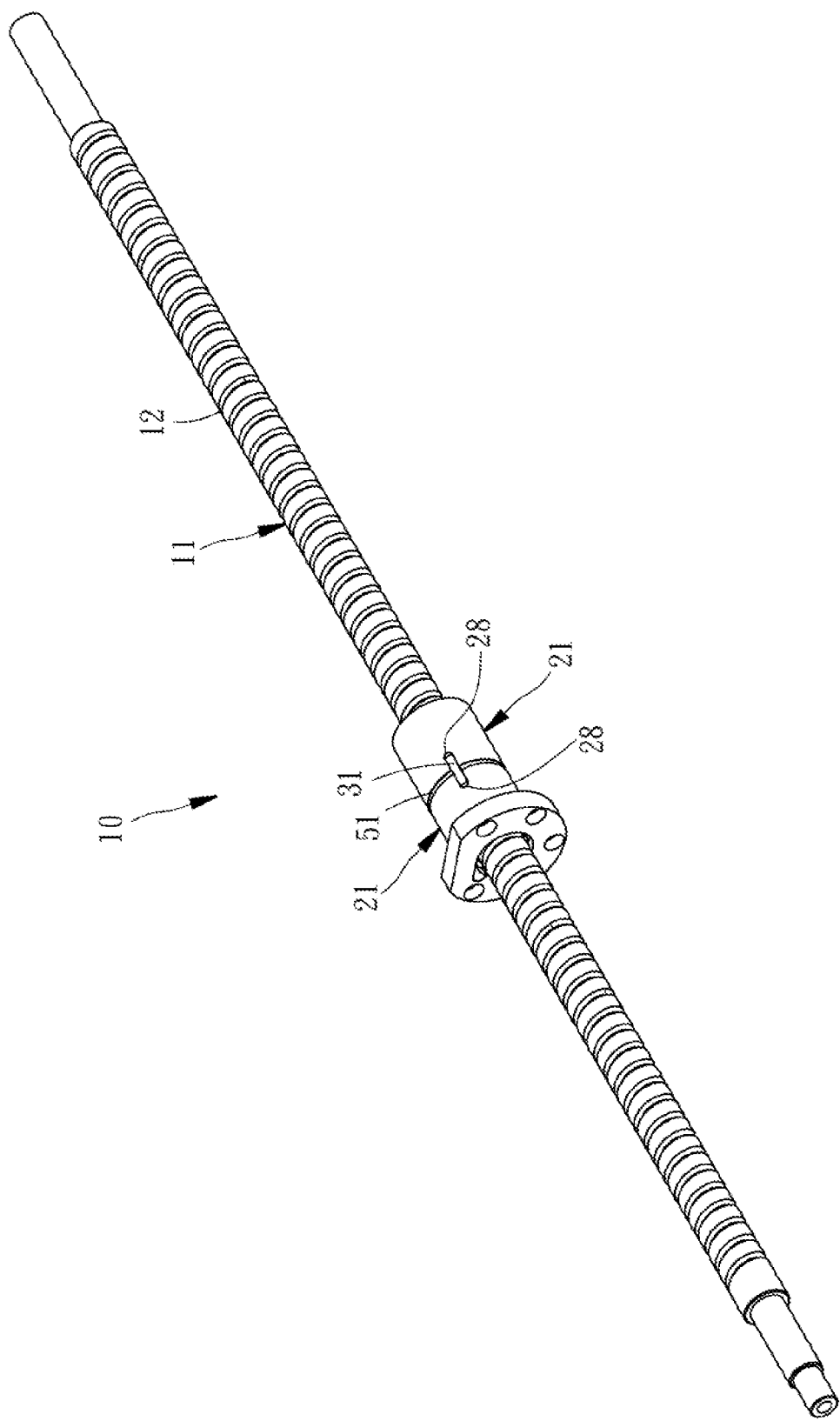
FIG. 1 is an assembled perspective view of a double nut ball screw in accordance with a preferred embodiment of the present invention.
Figure 2:
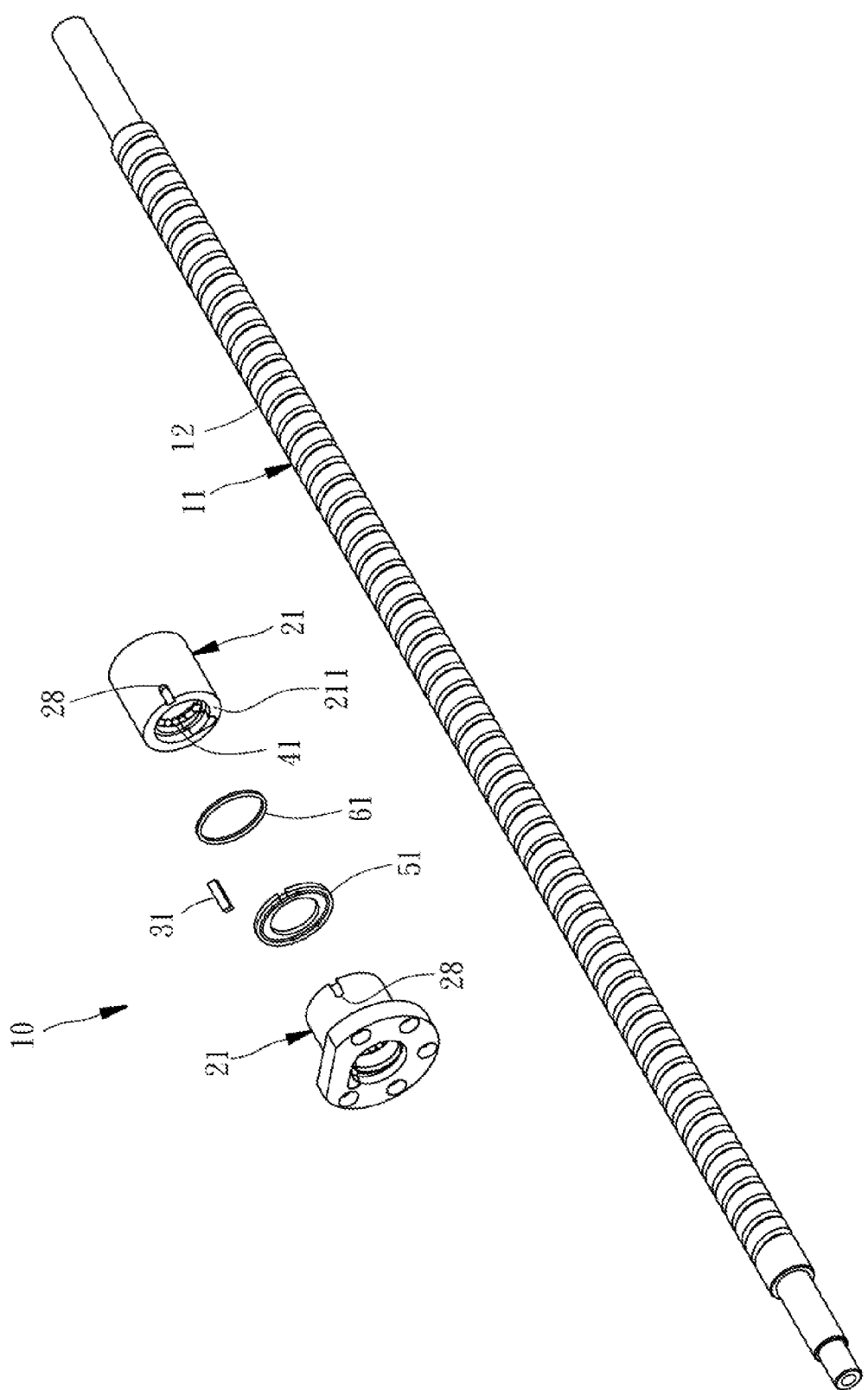
FIG. 2 is an exploded perspective view of the double nut ball screw in accordance with the preferred embodiment of the present invention.
Figure 3:
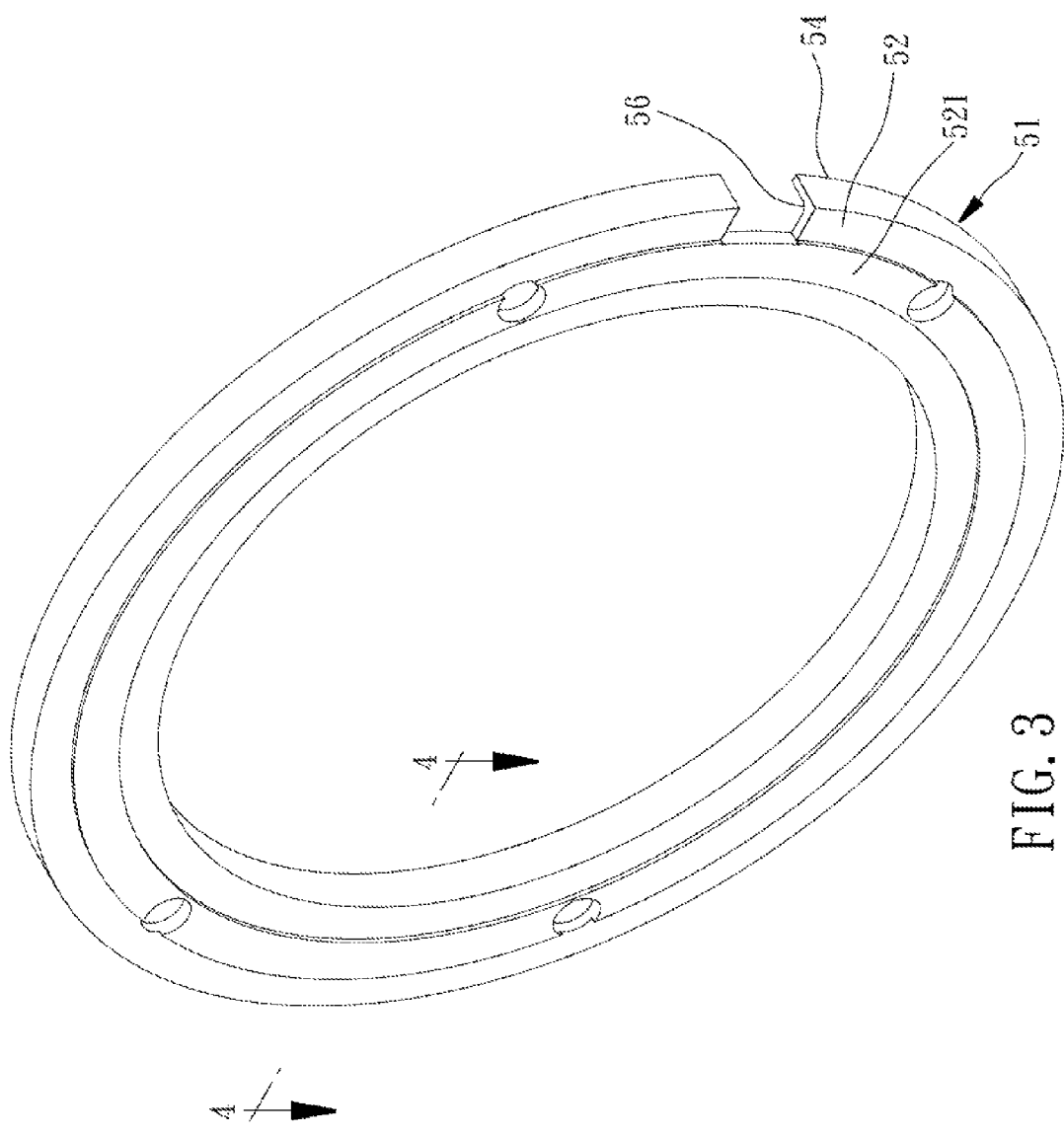
FIG. 3 is a perspective view of a deformable annular platform of the double nut ball screw in accordance with the preferred embodiment of the present invention.
Figure 4:
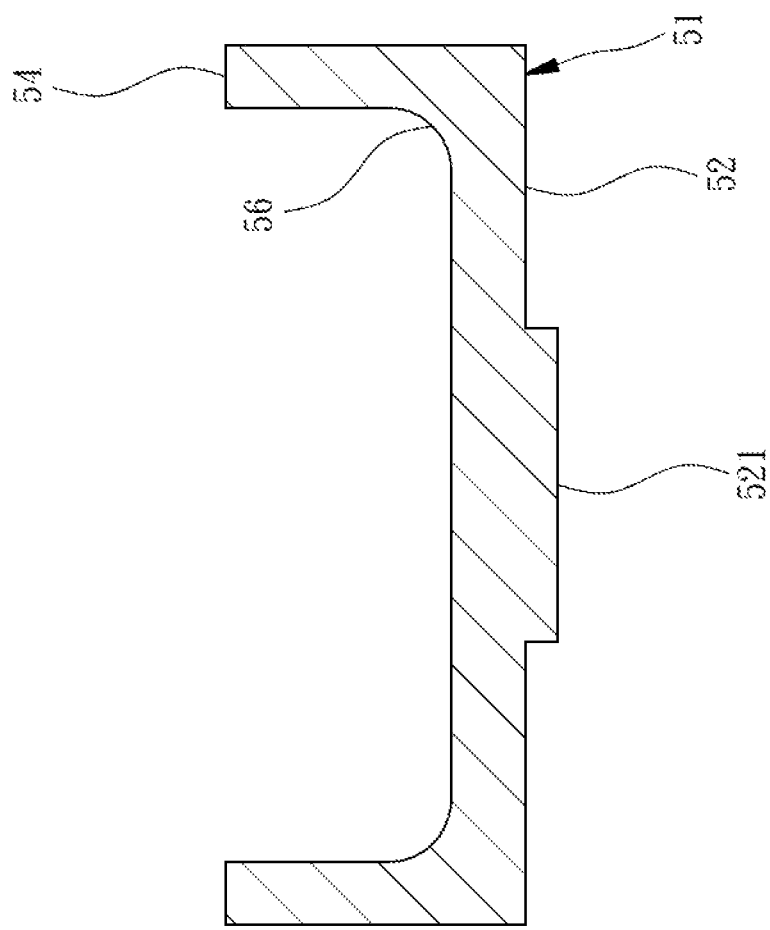
FIG. 4 is a sectional view taken along line 4-4 of FIG. 3.
Figure 5:
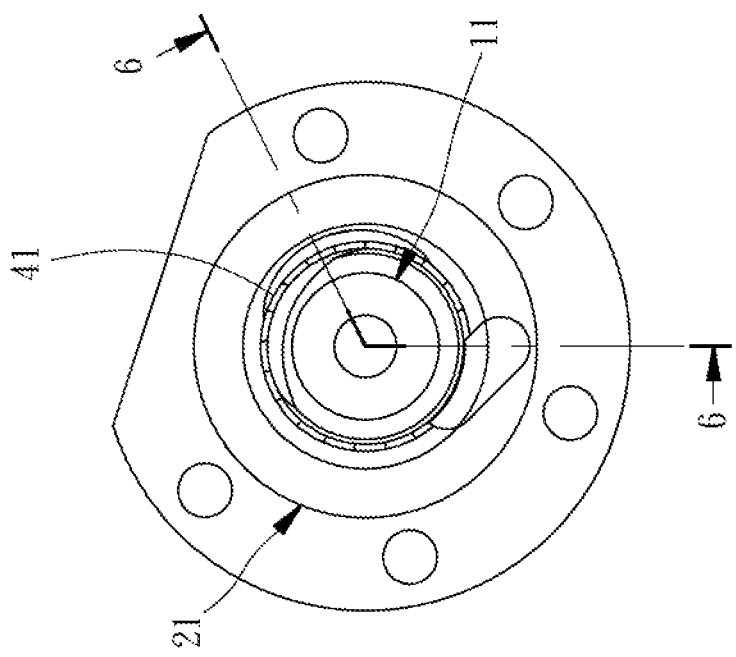
FIG. 5 is a schematic side view of the double nut ball screw in accordance with the preferred embodiment of the present invention.
Figure 6:
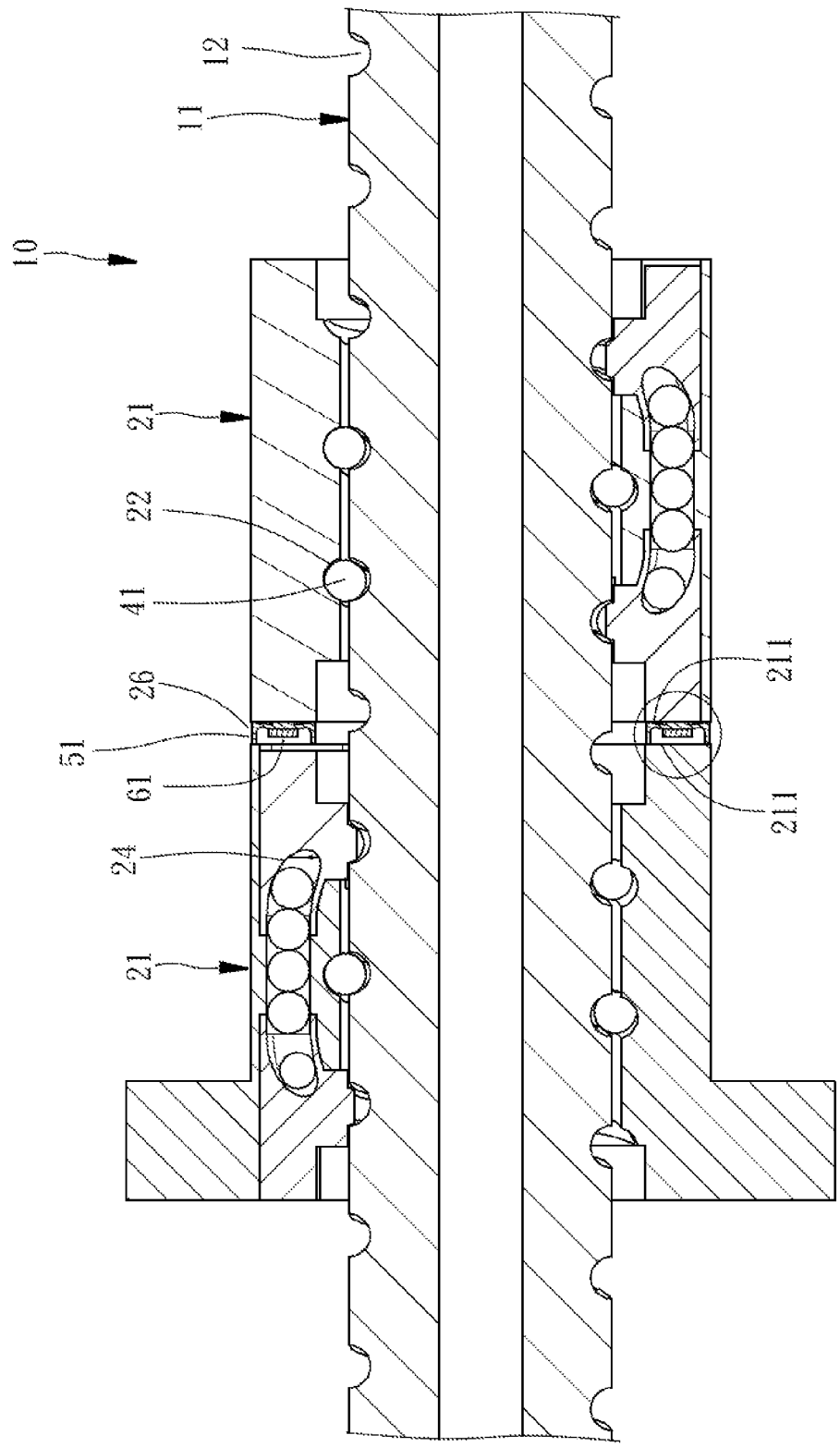
FIG. 6 is a sectional view taken along line 6-6 of FIG. 5.

Referring to FIGS. 1-7, a double nut ball screw having a preload sensing function in accordance with a preferred embodiment of the present invention is shown. The double nut ball screw 10 comprises a screw rod 11, two nuts 21, a connection key 31, a plurality of balls 41, a deformable annular platform 51 and a force sensor 61.

The screw rod 11 has an outer thread 12.

Each of the nuts 21 has an inner thread 22 and a mating surface 211. The two nuts 21 are threaded onto the screw rod 11, defining with the screw rod 11 a ball circulation path 24. The mating surfaces 211 of the nuts 21 face toward each other, and a gap 26 is defined between the mating surfaces 211 of the two nuts 21. Each nut 21 is provided on the periphery thereof with a keyway 28, and the keyways 28 of the two nuts 21 are in alignment with each other and located adjacent to the gap 26.

The connection key 31 is mounted in the keyways 28 of the two nuts 21 to bridge the two nuts 21 over the gap 26. Thus, the connection key 31 locks the two nuts 21 to prohibit them from rotation relative to each other, ensuring that the two nuts 21 are kept thread-connected to the screw rod 11 and maintaining a constant spacing between the two nuts 21.

The balls 41 are mounted in the ball circulation path 24, and capable of rolling and moving in the ball circulation path 24 upon rotation of the screw rod 11.

The deformable annular platform 51 has a substantially U-shaped cross section with a bottom wall portion 52 and two sidewall portions 54 integrally connected with two opposite lateral sides of the bottom wall portion 52, respectively.

The force sensor 61 is an annular member mounted on the bottom wall portion 52 of the deformable annular platform 51 and located between the two sidewall portions 54.

The deformable annular platform 51 further has a protruded portion 521 located on an outer surface of the bottom wall portion 52 opposite to the force sensor 61. The width of the protruded portion 521 is not larger than the width of the bottom wall portion 52. Further, the deformable annular platform 51 is disposed in the gap 26 and wedged between the mating surfaces 211 of the two nuts 21, wherein, in cross section, the deformable annular platform 51 has the distal ends of the two sidewall portions 54 abutted against the mating surface 211 of one nut 21 and the protruded portion 521 abutted against the mating surface 211 of the other nut 21.

In the present preferred embodiment, the two sidewall portions 54 of the deformable annular platform 51 are arranged in parallel in a perpendicular manner relative to the bottom wall portion 52; the width of the protruded portion 521 is not larger than one half of the width of the bottom wall portion 52; the protruded portion 521 is located at the center of the outer surface of the bottom wall portion 52, and kept away from the two opposite lateral sides of the bottom wall portion 52 at a predetermined distance; further, an arc-shaped connecting surface 56 is connected between each sidewall portion 54 and the bottom wall portion 52. Further, the two sidewall portions 54 are disposed perpendicular to the bottom wall portion 52, thus, when the two nuts 21 are forced to wedge the deformable annular platform 51, the wedging force is kept in parallel to the two sidewall portions 54 to provide full support to the bottom wall portion 52 and the protruded portion 521. If the two sidewall portions 54 are not disposed perpendicular to the bottom wall portion 52, the two sidewall portions 54 are relatively more liable to be deformed upon wedged by the two nuts 21, lowering the support. Further, the design that the width of the protruded portion 521 is not greater than one half of the width of the bottom wall portion 52 and the protruded portion 521 is located at the center of the outer surface of the bottom wall portion 52 achieves the result that the area of the bottom wall portion 52 around two opposite lateral sides of the protruded portion 521 will be deformed heavily and the area of the protruded portion 521 itself will not be heavily deformed when the wedging force is acted upon the protruded portion 521. This result can properly enlarge the deformation of the protruded portion 521 to enhance the sensing performance of the force sensor 61. The design of the connecting surfaces 56 is to provide a proper connection effect, enhancing the structural strength of the deformable annular platform 51.

After understanding of the architecture of the preferred embodiment of the present invention, the operation of the double nut ball screw is outlined hereinafter.

Figure 7:
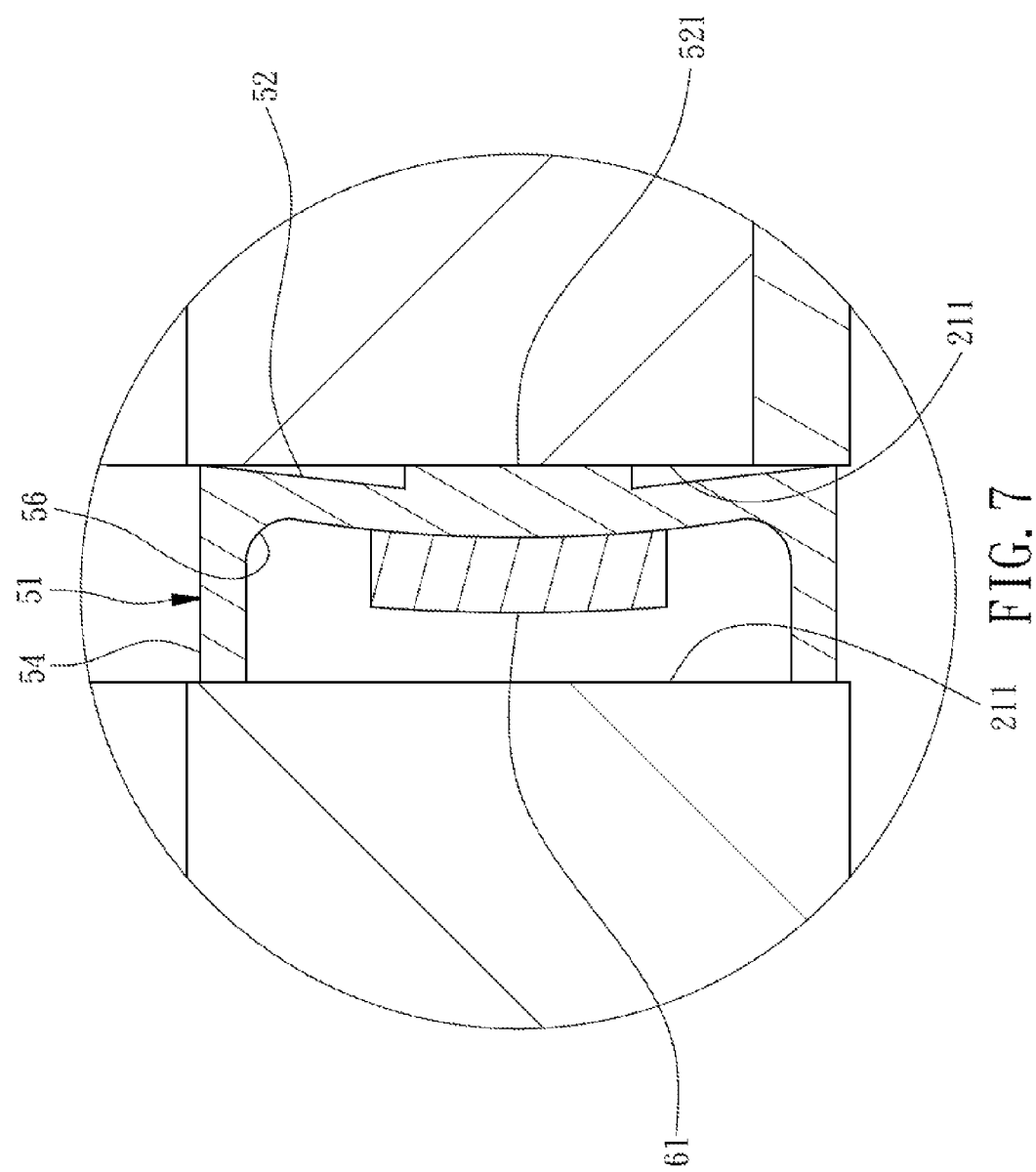
FIG. 7 is an enlarged view of a part of FIG. 6.

As shown in FIG. 7, when the double nut ball screw is not in operation, the force acted by the mating surfaces 211 of the two nuts 21 onto the deformable annular platform 51 is the preload of the double nut ball screw in the non-operation status. At this time, the protruded portion 521 and the distal ends of the two sidewall portions 54 of the deformable annular platform 51 are abutted against the mating surfaces 211 of the two nuts 21, therefore, subject to the effect of the preload, the protruded portion 521 is slightly moved toward the two sidewall portions 54, forcing the area of the bottom wall portion 52 around the two opposite lateral sides of the protruded portion 521 to deform and further causing a corresponding deformation of the protruded portion 521, and thus, the force sensor 61 can well detect the pressure.

During operation, the two nuts 21 will be moved back and forth along the screw rod 11 as the screw rod 11 is rotated. In this process of displacement, the spatial relationship between the two nuts 21 will be changed due to the effect of an external force, i.e., the preload between the two nuts 21 will be changed in this process of displacement. Thus, the deformation of the protruded portion 521 will be relatively changed, and this change can be detected by the force sensor 61. Therefore, the user can use the detection result of the force sensor 61 to judge the normality of the preload.

As illustrated in FIG. 8, after a long use or once the double nut ball screw starts to wear, the gap between the two nuts 21 will be increased. When this condition occurs, it means that the preload between the two nuts 21 is relatively lowered, and the extent of deformation of the deformable annular platform 51 will be reduced, as shown in FIG. 8.

In conclusion, the invention uses the deformable annular platform 51 to convert the effect of the preload to deformation, enabling the force sensor 61 to detect the deformation for preload normality determination. The prior art technique is to set the force sensor 61 between the two nuts 21 for detecting the preload directly without providing any measure to improve the detection sensitivity and effect. By means of the deformation of the deformable annular platform 51 in response to the preload for sensing by the force sensor 61, the invention enlarges the effect of the preload, significantly enhancing the sensitivity and effect of the preload detection performance of the force sensor 61.

What is claimed is:

1. A double nut ball screw, comprising:
   a screw rod having an outer thread;
   two nuts, each of which has a mating surface and an inner thread, said two nuts being threaded onto said screw rod, said two nuts and said screw rod defining a ball circulation path, the mating surface of one of said nuts facing toward the mating surface of the other of said nuts with a gap left therebetween, each of said nuts being provided on a periphery thereof with a keyway, the keyways of said two nuts being in alignment with each other and located adjacent to the gap;
   a connection key mounted in said keyways of said two nuts to bridge said two nuts over said gap;
   a plurality of balls mounted in said ball circulation path and capable of rolling and moving in said ball circulation path upon rotation of said screw rod;
   a deformable annular platform having a U-shaped cross section with a bottom wall portion and two sidewall portions integrally connected with two opposite lateral sides of said bottom wall portion respectively; and
   a force sensor of annular shape mounted on said bottom wall portion of said deformable annular platform and located between said two sidewall portions;
   wherein said deformable annular platform further has a protruded portion located on an outer surface of said bottom wall portion opposite to said force sensor; a width of said protruded portion is not larger than a width of said bottom wall portion;
   said deformable annular platform is disposed in said gap and wedged between the mating surfaces of said two nuts; said deformable annular platform has distal ends of said two sidewall portions thereof abutted against the mating surface of one of said nuts and said protruded portion abutted against the mating surface of the other of said nuts.

2. The double nut ball screw as claimed in claim 1, wherein said two sidewall portions are disposed in parallel in a perpendicular manner relative to said bottom wall portion.

3. The double nut ball screw as claimed in claim 1, wherein the width of said protruded portion is not larger than one half of the width of said bottom wall portion.

4. The double nut ball screw as claimed in claim 1, wherein said deformable annular platform further has two arc-shaped connecting surfaces; said two sidewall portions have opposite surfaces; said two connecting surfaces are respectively connected between said opposite surfaces and said bottom wall portion integrally.

5. The double nut ball screw as claimed in claim 1, wherein said protruded portion is located at a center of the outer surface of said bottom wall portion and kept away from the two opposite lateral sides of said bottom wall portion at a predetermined distance.

\* \* \* \* \*